United States Patent Office 3,301,863
Patented Jan. 31, 1967

3,301,863
AMINO DERIVATIVES OF PHENETHYL-
PYRIDINES
Frank J. Villani, West Caldwell, N.J., assignor to Schering
Corporation, Bloomfield, N.J., a corporation of New
Jersey
No Drawing. Filed Mar. 18, 1965, Ser. No. 440,919
13 Claims. (Cl. 260—293)

This application is a continuation-in-part of my copending application Serial No. 420,101, filed on December 21, 1964, now abandoned which in turn is a continuation-in-part of my copending applications Serial Nos. 330,263 and 330,244 both filed on December 13, 1963, which in turn are continuation-in-part applications of my copending application Serial No. 275,237, filed on April 24, 1963.

This invention relates to compositions of matter classified in the art of chemistry as derivatives of phenethylpyridines and to processes for making and using such compositions.

The invention sought to be patented in one of its composition aspects is described as residing in the concept of phenethylpyridine having vicinal to its phenethyl moiety the substituent

wherein Q is a member of the group consisting of O, NH, (H,OH), and (lower alkyl, OH) and T is a member of the group consisting of lower alkyl, piperidyl and —XN—$R_1R_2$, X being a lower aliphatic saturated hydrocarbyl having at least two linear carbon atoms and $R_1$ and $R_2$ are members of the group consisting of hydrogen and lower alkyl and when taken together with the nitrogen atom to which they are attached, $NR_1R_2$ represent a heterocycle having 5–6 cyclic atoms, one of said cyclic atoms, other than the aforesaid nitrogen atom, being selected from the group consisting of C, O, and N, all other cyclic atoms being carbon.

The invention sought to be patented in one of its process aspects resides in the concept of transforming the novel chemical compositions of this invention into aza-dibenzo-[a,d]-cycloheptenes; said aza-dibenzocycloheptenes being characterized by their antihistaminic, anti-serotonic and anti-anaphylatic action. Therefore the compositions of this invention are useful intermediates for the preparation of aza-dibenzocycloheptenes which are useful in the treatment of allergic disorders such as urticaria, seasonal rhinitis and pollen sensitivity. The aza-dibenzocycloheptenes for which the compositions of matter of this invention are useful, although more fully described in my above-mentioned earlier filed applications, may be defined as compounds of the formula:

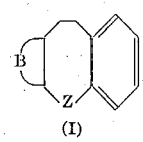

(I)

wherein B, together with the carbon atoms to which it is attached, represents a fused pyridine ring, and Z is a member of the group consisting of

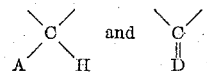

wherein A is a member of the group consisting of piperidyl and

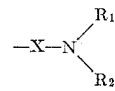

and D is a member of the group consisting of piperidylidene and

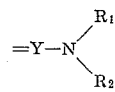

$R_1$ and $R_2$ are members of the group consisting of hydrogen and lower alkyl and together with the nitrogen to which they are attached form a heterocycle having 5–6 cyclic atoms, one of said cyclic atoms, other than the aforesaid nitrogen atom, being selected from the group consisting of C, O, and N, all other cyclic atoms being carbon, and X and Y, respectively are hydrocarbyl and hydrocarbylidene groups having 2–9 carbon atoms. Included within the scope of this group of aza-dibenzocycloheptenes are those compounds possessing one or more substituents in the benzenoid portion of the tricyclic nucleus, substituents preferably being located in the 7- and/or 8-positions. The substituents include lower alkyl, halogen, haloalkyl, hydroxy and lower alkoxy. The preferred substituted compounds are those aza-dibenzocycloheptenes having chloro, bromo, methoxy in the 8-position thereof, chloro, bromo, methoxy in the 7-position thereof and the di-substituted compounds having chloro, bromo and methoxy in both the 7- and 8-positions thereof.

In essence then, the invention sought to be patented in its composition-of-matter aspect may be defined as those phenethylpyridine derivatives which are useful in the preparation of the compounds embraced by Formula I, said phenethylpyridine derivatives being further depicted as compounds of the formula:

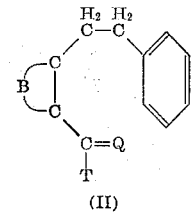

(II)

wherein B, together with the carbon atoms to which it is attached represents a pyridine ring; Q is a member of the group consisting of O, NH, (H,OH) and (lower alkyl, OH), and T is a member of the group consisting of lower alkyl, piperidyl and

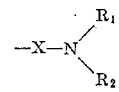

wherein said

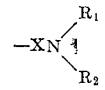

is as defined in Formula I above. The term "lower" when used throughout this application to modify radicals such as alkyl and alkoxy is meant to include those radicals containing 1–6 carbon atoms.

The compositions-of-matter represented by Formula II may be prepared from cyano-substituted phenethylpyridines (III) by reactions which, per se, are well known to those skilled in the art. For example, the ketimines (hereinafter referred to as imines) and ketones, i.e., those compounds of Formula II wherein Q represents NH and O, respectively, may be prepared by reacting the appropriate cyano-substituted phenethylpyridine with a Grignard-type reagent using techniques well known in the art according to the following reaction scheme:

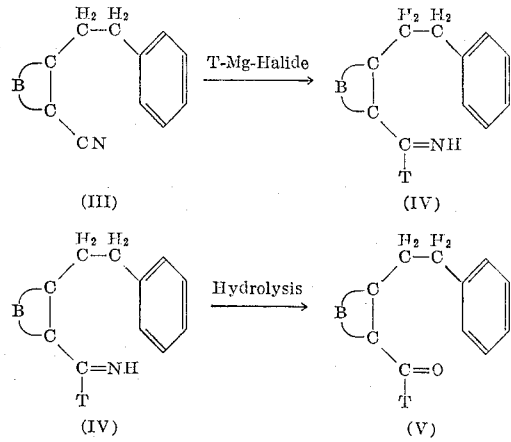

wherein T and B are as defined for Formula II. In this reaction the nitrile (III) reacts with the Grignard reagent to give imine derivatives (IV) which upon hydrolysis yield the ketones (V). In a preferred procedure the nitrile (III) is added either in solid form or in an inert-solvent solution to a Grignard reagent-containing inert-solvent solution. Representative inert solvents are, for example, ether, benzene, tetrahydrofuran and the like. Representative of the organometallic Grignard reactants are N-methyl-4-piperidyl magnesium chloride, dimethylaminopropyl magnesium chloride, methyl magnesium chloride and the like which are prepared in a known manner from magnesium and the corresponding alkyl halide and amino alkyl halide. The reaction mixture may be heated, preferably under reflux conditions, after which time it is subjected to hydrolysis. It is preferred to use excess quantities of the Grignard reagent over the quantities of the nitrile. In those reactions wherein the Grignard reagent contains a free amino group, such as a primary or secondary amine, the free amino group must be protected prior to formation of the organometallic reactant in order to prevent these groups from reacting with the metallo-organic reagent. The blocking groups may easily be cleaved by catalytic hydrogenation to regenerate the corresponding amine. I prefer to use benzyl blocking groups.

As would be expected, in those instances wherein T is representative of an amine the nitrogen atom of which is separated from the carbonyl by a hydrocarbyl radical having two linear carbon atoms (e.g. when T represents dimethylaminoethyl) then such groups are formed by a Mannich-type reaction, wherein a condensation is effected in the presense of an amine and formaldehyde. In such reactions it is preferred to use the formaldehyde reactant in one of its polymeric forms, e.g. trioxymethylene, and to use the amine reactant as a hydrochloride and thus the resulting base may readily be isolated as the hydrochloride. The condensation is conducted in an anhydrous medium, e.g. absolute methanol, under reflux conditions according to techniques well known in the art.

The formation of the above described secondary carbinols (i.e., those compositions of matter of Formula II wherein Q is representative of (H,OH)) may readily be prepared by reacting the ketones of Formula II with such reducing systems as sodium borohydride in anhydrous methanol, lithium aluminum hydride, zinc dust in ammonia, or by catalytic reduction with platinum oxide or Raney nickel and the like. The formation of the above described tertiary carbinols (i.e. those compositions of matter of Formula II wherein Q is representative of (alkyl, OH)) may be prepared by reacting the ketones of Formula II with a Grignard-type reagent, (e.g. a lower alkyl magnesium halide) to form the appropriate Grignard intermediate, which intermediate is subjected to hydrolysis.

The nitrile intermediates (III) described above may be prepared from the appropriate carboxy-substituted phenethylpyridine according to the following reaction scheme:

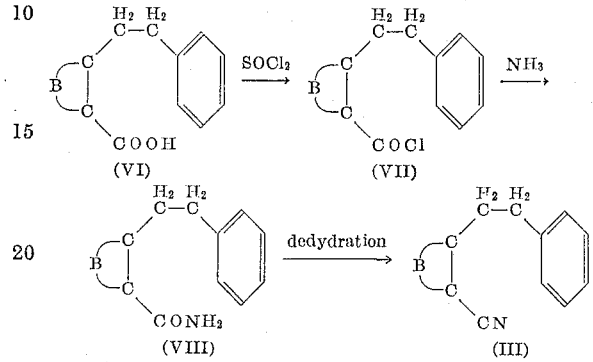

wherein the carboxylic acid is first converted to its acid chloride such as by means of thionyl chloride (or equivalent-functioning reagents such as phosphorous trichloride or oxalyl chloride). The resulting acid chloride is then converted to the corresponding amide by reaction with ammonia according to techniques well known to the art. The so-formed amides are converted to the appropriate nitrile (III) by reaction with dehydration agents such as thionyl chloride, phosphorous pentoxide, and the like according to techniques well known in the art.

It is, of course, to be well understood that in those instances wherein it is desired to prepare aza-dibenzocycloheptenes having one or more of the aforementioned substituents in the benzenoid moiety of the tricyclic nucleus then one would start with the appropriately substituted carboxy phenethylpyridine. Such substituted compounds are either known per se or may readily be prepared by techniques obvious to one of ordinary skill in the art. Such substituted compounds are the equivalents of the compounds specifically depicted in Formula II and as such are embraced within the scope of this invention.

The preparation of the therapeutically useful aza-dibenzocycloheptenes may be effected via an intramolecular cyclization which may be accomplished by heating the imines, the ketones or the carbinols of Formula II with reagents such as polyphosphoric acid, sulfuric acid, zinc chloride and other similarly acting acid dehydrating agents. Preferably the imines, ketones and carbinols are heated with polyphosphoric acid in a temperature range of about 100° C. to 160° C. whereby cyclization occurs. In those instances wherein either the imine or the ketone is cyclized an aza-dibenzocycloheptene having an exocyclic unsaturation in the 5-position thereof is formed whereas cyclization of the carbinols results in an aza-dibenzocycloheptene without such unsaturation. Conversion of the exocyclically unsaturated aza-dibenzocycloheptenes (i.e. those compounds of Formula I wherein Z represents C=D) to the corresponding saturated aza-dibenzocycloheptenes may be effected by reduction of the exocyclic double bond.

The following examples are merely illustrative of the product and process aspects of this invention and are in no way intended to limit the scope thereof.

PREPARATION OF KEY INTERMEDIATES

*Preparation A*

2-PHENETHYL-NICOTINIC ACID
And
2-PHENETHYL-3-CYANOPYRIDINE

*Step 1: 2-(2-hydroxyphenethyl)-nicotinic lactone hydrochloride.*—Stir and reflux a mixture of 65 g. of ethyl 2- methyl-nicotinate, 57 g. of benzaldehyde and 37 ml. of acetic anhydride for 20 hours. Cool and pour the mixture into 2.0 N hydrochloric acid. After crystallization filter and recrystallize the solid from ethanol obtaining 2-(2-hydroxyphenethyl-nicotinic lactone) hydrochloride, M.P. 183–185° C., which compound for purposes of clarity correspond to the following structural formula:

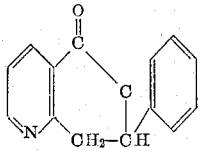

Step 2: 2-stilbazole-3-carboxylic acid.—Admix 60 g. of red phosphorous, 20 g. of iodine in 1.5 l. glacial acetic acid and add in portions 176 g. of 2-(2-hydroxypheneth-yl)-nicotinic lactone hydrochloride. Reflux for 20 hours and filter the hot solution through a sintered glass funnel. Pour the filtrate into water and filter the precipitate after allowing time for formation and coagulation. Dissolve the precipitate in 2 l. of warm dilute ammonium hydroxide (10–15%). Filter, and neutralize the filtrate with acetic acid. Cool and filter the precipitated 2-stilbazole-3-carboxylic acid. Recrystallize from ethanol, M.P. 219–221° C. (130 g.).

Step 3: 2-phenethyl-nicotinic acid.—In a shaker-type hydrogenation (Parr), mix 22 g. of 2-stilbazole-3-carboxylic acid, 200 ml. of ethanol and 20 ml. of 25% aqueous sodium hyroxide. Hydrogenate the mixture at 50 lbs. pressure of hydrogen using freshly prepared Raney nickel catalyst. When the theoretical amount of hydrogen is absorbed (1 mole per mole of acid), filter and concentrate the filtrate by heating on a steam bath. Dissolve the residue in water, acidify with acetic acid and filter the crude phenethyl nicotinic acid. Recrystallize from benzene-hexane, M.P. 162–163° C.

Alternatively, 2-phenethyl-nicotinic acid is prepared by heating 100 gms. of the lactone (Step 1) with 1 liter 57% hydriodic acid while adding 60 g. red phosphorous over a period of two hours. Reflux the mixture for 18 hours and filter while hot. Remove most of the excess hydriodic acid by concentration and neutralize the remaining solution with ammonium hydroxide whereupon 2-phenethyl-nicotinic acid precipitates.

Step 4: 2-phenethyl-3-carboxamidopyridine.—To 100 gms. of 2-phenethyl-nicotinic acid add 350 ml. of thionyl chloride and evaporate off the excess thionyl chloride (in vacuo) and to the resulting residue add 100 ml. of anhydrous benzene. Evaporate the resulting mixture to dryness and to the resulting residue add 500 ml. of commercial ammonium hydroxide. Allow the mixture to stand for 2–3 hours, filter, and water-wash the precipitated solid. Recrystallize the washed 2-phenethyl-3-carboxamidopyridine from aqueous ethanol.

Step 5: 2-phenethyl-3-cyanopyridine.—A mixture containing 100 gms. of dry, powdered 2-phenethyl-3-carboxamidopyridine and 100 gm. of phosphorous pentoxide is mixed in a dry, round-bottom flask equipped with a condenser arranged for vacuum distillation. Reduce the pressure to 3–5 mm. and heat the reaction mixture until distillation ceases. Collect the product by ether extraction of the distillate. Dry and distill the ether extract to obtain 2-phenethyl-3-cyanopyridine.

Preparation B

3-PHENETHYL-ISONICOTINIC ACID
And
3-PENETHYL-4-CYANOPYRIDINE

Step 1: α-(4-methyl-nicotinoyl)-phenylacetonitrile.— Follow the procedure of Preparation D, step 1 using ethyl 4-methylnicotinate.

Step 2: Benzyl 3-(4-methyl)-pyridyl ketone.—Using the product of step 1, follow procedure of Preparation D, step 2.

Step 3: 3-phenethyl-4-methylpyridine.—Using the product of step 3, follow the procedure of Preparation D, step 3.

Step 4: 3-phenethyl isonicotinic acid.—Reflux a mixture of 8.6 g., 3-phenethyl-4-methylpyridine, 50 ml. dry pyridine, and 12 g. powdered selenium dioxide for three hours. Dilute with CHCl₃ and filter. Evaporate filtrate to a residue. Dissolve residue in dilute ammonium hydroxide and extract with ether. Acidify the aqueous layer with acetic acid and filter. Recrystallize from isopropyl ether, obtaining 3.9 g. M.P. 99–101° C.

Step 5: 3-phenethyl-4-carboxamidopyridine.—Using the product of step 4, and by following substantially the same procedure of step 4 of Preparation A, the desired carboxamide of this step is formed.

Step 6: 3-phenethyl-4-cyanopyridine.—Using equivalent quantities of the carboxamide product of step 5 and by following substantially the same procedure of step 5 of Preparation A, there is produced the desired nitrile of this example.

Preparation C

4-PHENETHYL NICOTINIC ACID
And
3-CYANO-4-PHENETHYLPYRIDINE

Step 1: Ethyl 4-stilbazole-3-carboxylate.—Stir and reflux a mixture of 165 g. of ethyl 4-methyl nicotinate, 106 g. of benzaldehyde and 1 liter of acetic anhydride for four hours. Pour onto ice, filter and recrystallize from benzene obtaining the ester of this step.

Step 2: 4-stilbazole-3-carboxylic acid.—Reflux for six hours a mixture of 50 g. of the ester from step 1, 50 g. of potassium hydroxide, 50 ml. of water and 200 ml. of ethanol. Concentrate to remove the solvents and dissolve the residue in 200 ml. of water. Neutralize with acetic acid and allow the 4-stilbazole-3-carboxylic acid to crystallize filter and dry.

Step 3: 4-phenethyl nicotinic acid.—Hydrogenate 22 g. of 4-stilbazole-3-carboxylic acid according the the analogous procedure described in Preparation A, step 3.

Alternatively, dissolve 20.2 g. of the ester from step 1 in 200 ml. of ethanol and hydrogenate under 50 lbs. pressure of hydrogen in the presence of 5 g. of 5% palladium-on-carbon catalyst at room temperature. Saponify the so-obtained ethyl 4-phenethyl nicotinate in a standard manner.

Step 4: 3-carboxamido-4-phenethylpyridine.—Using the acid obtained in step 3 and by following substantially the same procedure of step 4 of Preparation A, the desired carboxamide of this step is formed.

Step 5: 3-cyano-4-phenethylpyridine.—Using the carboxamide of step 4 and by following substantially the same procedure outlined in step 5 of Preparation A, there is produced the desired nitrile of this example.

Preparation D

2-CYANO-3-PHENETHYLPYRIDINE

Step 1: α-(Nicotinoyl)-phenylacetonitrile.—To a refluxing solution of 34 g. of sodium in 500 ml. of absolute ethanol, add dropwise, a mixture of 260 g. of ethyl nicotinate and 133 g. of phenylacetonitrile. After four hours, pour the mixture onto ice and extract with ether. Neutralize the aqueous phase with acetic acid and allow the product to crystallize. Filter, wash with water and air dry. The so-obtained α-(nicotinoyl)-phenylacetonitrile, M.P. 137–141° C. is used in the next step without further purification.

Step 2: Benzyl 3-pyridyl ketone.—Reflux the nitrile from step 1 for 16 hours with 1.4 liters of concentrated hydrobromic acid. Pour the mixture over ice and allow to crystallize. Filter the hydrobromide salt, suspend the preparation in water and neutralize with sodium carbonate solution. Allow to crystallize, filter and air dry, yield 126 g., M.P. 53–56° C.

*Step 3: 3-phenethylpyridine.*—Admix 26 g. of the ketone from step 2, 11 g. of sodium hydroxide, 11 ml. of 85% hydrazine hydrate and 175 ml. of diethyleneglycol. Place the mixture in a still and heat at 235–240° C. for 3–4 hours permitting distillation to eliminate water and other low boiling liquids. Cool and extract the mixture and the distillate with benzene. Wash the combined benzene extracts with water and distill in vacuo collecting that fraction boiling at 120–128° C./1 mm., 21 g.

*Step 4: 3-phenethylpyridine N-oxide.*—Heat a mixture of 183 g. of 3-phenethylpyridine, 120 ml. of 30% hydrogen peroxide, and 300 ml. of glacial acetic acid for 20–24 hours at 60–65° C. Pour into ice water and adjust the pH to 8–9 with ammonium hydroxide. Filter and dissolve the precipitate in chloroform. Concentrate to a residue and precipitate with hexane obtaining 150–158 g., M.P. 82–89° C.

*Step 5: 2-cyano-3-phenethylpyridine.*—While stirring, add 75.6 g. of dimethyl sulfate, dropwise, to 118.8 g. of 3-phenethylpyridine N-oxide. Heat the mixture at 85° C. for three hours. Cool and dissolve in 180 ml. of water. Add the aqueous solution dropwise to a stirred solution of 88.2 g. of sodium cyanide in 250 ml. of water, all under an atmosphere of nitrogen with the reaction temperature in the range of 0–5° C. Stir for six hours at 0° C., and then allow the mixture to warm to room temperature by standing overnight. Extract with chloroform, wash extracts with water and distil in vacuo, collecting that fraction boiling at 160–167° C. at 0.8 mm.

Having described the methods of preparation of the phenethylpyridyl nitriles (Formula III) the following example illustrates the general approach for the preparation of lower alkyl, lower alkoxy, halogen, hydroxy and haloalkyl substituted phenethyl pyridyl nitriles suitable for use in the preparation of azadibenzocycloheptenes having such substituents in the benzenoid moiety of the tricyclic nucleus of such compounds. Such substituted nitriles are the equivalents of the nitriles depicted in Formula II, and as such it is intended to have Formula II embrace such compounds.

*Preparation E*

3-(β-(3,4-DIMETHOXYPHENYL)ETHYL)-PYRIDINE
And
2-CYANO-3-(β-(3,4-DIMETHOXYPHENYL)-β-ETHYL)-PYRIDINE

*Step 1: α-(3,4-dimethoxyphenyl)-β-(3-pyridyl)-acrylic acid.*—Heat at about its reflux temperature a mixture containing 562 g. of homoveratic acid (as its sodium salt), 284.6 g. of 3-pyridine-aldehyde and 3.0 l. of acetic anhydride for eighteen hours. Evaporate off the excess acetic anhydride, pour the residue into ice water to obtain crystals of α-(3,4-dimethoxyphenyl)-β-(3-pyridyl)-acrylic acid.

*Step 2: 3-(3,4-dimethoxyphenyl)-stilbazole.*—To a heated (210–220° C.) suspension of 800 ml. of distilled quinoline and 25 g. of copper chromite (catalyst), slowly, and in a portionwise fashion, add 250 g. of the crude α-(3,4-dimethoxyphenyl)-β-(3-pyridyl)-acrylic acid of step 1. Heat the resulting mixture at 220–230° C. for four hours, cool, add 300 ml. of methylene chloride and filter. Fractionally distil the filtrate to obtain; after the preliminary forerun of quinoline, the resulting 3,4-dimethoxyphenyl stilbazole, B.P. 170°–189° C./0.5 mm.

*Step 3: 3-(3,4-dimethoxyphenyl)-dihydro-stilbazole.*— In a Parr shaker hydrogenate a solution of 53 g. of 3-(3,4-dimethoxy)-stilbazole in 200 ml. of ethanol in the presence of 1 g. of platinum oxide under about 50 lbs. pressure until the theoretical amount of hydrogen is absorbed. Filter, evaporate off the excess solvent, and distil to obtain 3-(3,4-dimethoxyphenyl)-dihydro-stilbazole, B.P. 176–180° C./0.5 mm.

*Step 4.*—The N-oxide of the product obtained in step 3 above is prepared according to the procedure outlined in step 4 of Preparation D.

*Step 5: 2-cyano-3-(β-(3,4-dimethoxyphen)ethyl)-pyridine.*—The N-oxide obtained in step 4 is converted to the desired nitrile according to the procedure outlined in step 5 of Preparation D.

In a similar manner by using the appropriately substituted starting materials (which are either known per se or may readily be prepared from known compounds by techniques apparent to one of ordinary skill in the art) and by following the teachings set forth in the foregoing specific exemplifications, the following compounds are also prepared:

2-cyano-3-(β-(3-chlorophen)ethyl)-pyridine
2-cyano-3-(β-(4-chlorophen)ethyl)-pyridine
2-cyano-3-(β-(3-bromophen)ethyl)-pyridine
2-cyano-3-(β-(4-bromophen)ethyl)-pyridine
2-cyano-3-(β-(3-hydroxyphen)ethyl)-pyridine
2-cyano-3-(β-(3-methoxyphen)ethyl)-pyridine
2-cyano-3-(β-(3-methylphen)ethyl)-pyridine
2-cyano-3-(β-(3-trifluoromethylphen)ethyl)-pyridine
2-cyano-3-(β-(4-methoxyphen)ethyl)-pyridine
2-cyano-3-(β-(4-methylphen)ethyl)-pyridine
2-cyano-3-(β-(4-trifluoromethylphen)ethyl)-pyridine
2-cyano-3-(β-(3,4-dichlorophen)ethyl)-pyridine
2-cyano-3-(β-(3,4-dibromophen)ethyl)-pyridine
2-cyano-3-(β-(3,4-dimethylphen)ethyl)-pyridine
2-cyano-3-(β-(3,4-dihydroxyphen)ethyl)-pyridine

PREPARATION OF IMINES

*Preparation F*

3-(β-PHENETHYL)-2-PYRIDYL-N-METHYL-4-PIPERIDYL IMINE

To a mixture containing 2.9 g. of magnesium, 30 ml. of tetrahydrofuran, one crystal of iodine and ½ ml. of ethyl bromide, add a solution of 15 g. of N-methyl-4-chloropiperidine in 60 ml. of anhydrous tetrahydrofuran and heat the resulting mixture under reflux conditions for about two hours. To the resulting mixture, add, in a dropwise fashion, a solution containing 20.8 g. of 3-β-phenethyl-2-cyanopyridine and 100 ml. of tetrahydrofuran and heat the resulting mixture under reflux conditions for about sixteen hours. Evaporate off the excess tetrahydrofuran, cool the resulting residue, add 100 ml. of benzene. Decompose the Grignard complex with 100 ml. of 10% ammonium chloride water solution and extract the desired 3-(β-phenethyl) - 2 - pyridyl-N-methyl-4-piperidyl imine with benzene.

It is evident that other halides, in place of the N-methyl-4-chloropiperidine above, may be prepared in a known manner and substituted into the foregoing procedure so as to obtain the appropriate Grignard reagent, whereupon such Grignard reagent upon reaction with the above nitrile yields the corresponding imine. Representative of such reagents are N-ethyl-4-piperidyl chloride, N-methyl-3-piperidyl chloride, 4-piperidyl chloride, N-benzyl-4-piperidyl chloride, 3-dimethylaminopropyl chloride, 4-dimethylaminobutyl chloride, 3-(N-methyl-N-ethylamino)-propyl chloride, 5-dimethylamino-pentyl chloride, 8-dimethylamino-octyl chloride, 4-dimethylaminocyclohexyl chloride, 3-(4-dimethylaminocyclohexyl)-propyl chloride, 4 - dimethylaminocyclohexyl-methyl chloride, 3 - pyrrolidinopropyl chloride, 3-piperidinopropyl chloride, 3-morpholinopropyl chloride, 3 - (4-methyl)-piperazinopropyl chloride, 3-(4-(2-hydroxyethyl)-piperazino)-propyl chloride, 3-p-dimethylamino-phenyl chloride, 3-diethylamino-butyl chloride and the like.

It is also evident that such reagents may be converted to the corresponding Grignard-type reagents and subjected to the foregoing procedure to react with the nitriles of preparations A, B, and C (as well as their benzenoid substituted analogs) as well as the nitriles enumerated in Preparation E, to obtain the corresponding imines.

In order to prepare imines of Formula II wherein T contains a primary or secondary amino group such as 3- methylaminopropyl or 3-aminopropyl the amino group is first proteceted by benzylation prior to formation of the Grignard reagent, thus utilizing the foregoing procedure one would react for example 3-(N-methyl-N-benzylamino)-propyl magnesium chloride with the appropriate nitrile. Subjecting the imines so formed to catalytic debenzylation by methtods well known in the art affords the corresponding primary or secondary amine derivative.

PREPARATION OF KETONES

Preparation G
3-(β-PHENETHYL)-2-PYRIDYL-N-METHYL-4-PIPERIDYL KETONE

To a mixture containing 2.9 g. of magnesium, 30 ml. of tetrahydrofuran, one crystal of iodine and ½ ml. of ethyl bromide, add a solution of 15 g. of N-methyl-4-chloropiperidine in 60 ml. of anhydrous tetrahydrofuran and heat the resulting mixture under reflux conditions for about two hours. To the resulting mixture, add, in a dropwise fashion, a solution containing 20.8 g. of 3-β-phenethyl-2-cyanopyridine and 100 ml. of tetrahydrofuran and heat the resulting mixture under reflux conditions for about sixteen hours. Evaporate off the excess tetrahydrofuran, cool the resulting residue, and add (with cooling) 200 ml. of concentrated hydrochloric acid. Stir the resulting mixture for six hours at room temperature and then heat the stirred solution for an additional four hours at reflux temperature. Cool, wash with ether, make the washed solution alkaline with ammonium hydroxide and extract with chloroform. Distill the chloroform extract to obtain 3-(β-phenethyl)-2-pyridyl-N-methyl-4-piperidyl ketone, B.P. 200–210° C./2 mm., $n_D^{28}$ 1.5657.

It is evident that other halides, in place of the N-methyl-4-chloropiperidine above, may be prepared in a known manner and substituted into the foregoing procedure so as to obtain the appropriate Grignard reagent, whereupon such Grignard reagent upon reaction with the above nitrile yields the corresponding ketone. Representative of such reagents are N-ethyl-4-piperidyl chloride, N-methyl-3-piperidyl chloride, 4-piperidyl chloride, N-benzyl-4-piperidyl chloride, 3-dimethylaminopropyl chloride, 4-dimethylaminobutyl chloride, 3-(N-methyl-N-ethylamino)-propyl chloride, 5-dimethylamino-pentyl chloride, 8 - dimethylamino-octyl chloride, 4 - dimethylaminocyclohexyl chloride, 3 - (4 - dimethylaminocyclohexyl)-propyl chloride, 4-dimethylaminocyclohexyl-methyl chloride, 3-pyrroldinopropyl chloride, 3-piperidinopropyl chloride, 3-morpholinopropyl chloride, 3 - (4 - methyl) - piperazinopropyl chloride, 3 - (4 - (2 - hydroxyethyl)-piperazino)-propyl chloride, p-dimethylamino-phenyl chloride, 3-diethylaminobutyl chloride and the like.

It is also evident that such reagents may be converted to the corresponding Grignard-type reagents and subjected to the foregoing procedure to react with the nitriles of preparations A, B, and C (as well as their bonzenoid substituted analogs) as well as the nitriles enumerated in Preparation E, to obtain the corresponding ketones.

In order to prepare ketones of Formula II wherein T contains a primary or secondary amino group such as 3-methylaminopropyl or 3-aminopropyl the amino group is first protected by benzylation prior to formation of the Grignard reagent, thus utilizing the foregoing procedure one would react for example 3-(N-methyl-N-benzylamino)-propyl magnesium chloride with the appropriate nitrile. Subjecting the ketones so formed to catalytic debenzylation by methods well known in the art affords the corresponding primary or secondary amine derivative.

Preparation H
3-PHENETHYL-2-(β-DIMETHYLAMINO-PROPIONYL)-PYRIDINE HYDROCHLORIDE

*Step 1: 3-phenethyl-2-acetylpyridine.*—To a solution of methyl magnesium iodide at 0° C. (prepared from 23 gms. of magnesium, 142 gms. of methyl iodine and 2 l. of ether) add an ethereal solution of 104 gms. of 3-phenethyl-2-cyano-pyridine and allow the mixture to come to room temperature. Heat the warmed mixture at reflux temperature for eighteen hours. Add about 500 ml. or 10% hydrochloric acid, stir for twenty minutes, and evaporate off the ether solvent. Add 1 l. of 20% hydrochloric acid. Warm the mixture on a steam bath for 10–15 hours, evaporate the excess solvent in vacuo and neutralize the residue with concentrated ammonium hydroxide. Extract the neutralized solution with chloroform and distill the chloroform extract to obtain 3-phenethyl-2-acetylpyridine, B.P. 190–195° C./1 mm.

*Step 2: 3-phenethyl-2-(β-dimethylamino - propionyl)-pyridine.*—Heat, at reflux temperature, a mixture containing 75 gms. of 2-acetyl-3-phenethyl-pyridine, 15 gms. of trioxymethylene, 25 gms. of dimethylamine hydrochloride, 5 mls. of concentrated hydrochloric acid and 500 mls. of absolute ethanol for six hours. Cool and add absolute ether to the resulting mixture to precipitate 3-phenethyl-2-(β-dimethylamino-propionyl)-pyridine HCl.

PREPARATION OF CARBINOLS

Preparation I
3-(β-PHENETHYL)-2-PYRIDYL (N-METHYL-4-PIPERIDYL) CARBINOL

To a solution of 10.3 g. of 3-β-phenethyl-2-pyridyl-N-methyl-4-piperidyl ketone in 150 ml. of methanol, add, in a portionwise fashion 1.7 g. of sodium borohydride and allow the mixture to stir for three hours at room temperature. Remove the excess methanol, dissolve the residue in water, and extract the product with ether. Remove the ether solvent and triturate the residue with hexane to yield 3-β-phenethyl-2-pyridyl-N-methyl-4-piperidyl carbinol, M. P. 83–84° C. Similarly those ketones prepared by the process of Preparation F may also be reduced to the corresponding ketone by following substantially the some process of this example.

Preparation J
3-PHENTHYL-2-(1-METHYL-1-HYDROXY-3-DIMETHYLAMINOPROPYL)-PYRIDINE A 20 gms. of methyl bromide to a stirred mixture containing 3.2 gms. of magnesium, 20 ml. of anhydrous tetrahydrofuran, 1 ml. of ethyl bromide and a crystal of iodine. Reflux the resulting mixture for two hours, cool to 30–35° C. and add 10.3 gms. of 3-phenethyl-2-(β-dimethylaminopropionyl)-pyridine in 25 ml. of tetrahydrofuran. Stir for five hours, remove the solvent by distillation in vacuo and add 250 ml. of ether. Add 100 ml. of 10% ammonium chloride solution and extract the mixture with chloroform. Concentrate the chloroform solution to a residue and recrystallize from isopropyl ether to obtain 3-phenethyl-2-(1-methyl - 1 - hydroxy-3-dimethylaminopropyl)-pyridine.

Of course in those instances wherein it is desired to ultimately produce a carbinol containing a primary or secondary amino group, the intermediate ketone containing the protective benzyl group on the amino group is not subjected to catalytic debenzylation processes until after the foregoing Grignard reaction.

RING CLOSURE REACTIONS

Preparation K
4-AZA-5-(N-METHYL - 4 - PIPERIDYLIDENE)-8-CHLORO-10,11-DIHYDRO-5H-DIBENZO-[a,d]-CYCLOHEPTENE Heat a mixture of 5 g. of 3-(β-(3-chlorophen)ethyl)-2-pyridyl-N-methyl-4-piperidyl imine and 250 g. of polyphosphoric acid at 160° C. for six hours with continuous stirring. Pour the resulting mixture into ice water, neutralize with ammonium hydroxide and extract with chloroform. Remove the excess solvent, absrob the residue onto 200 gms. of alumina and elute the column with benzene and finally with chloroform. Evaporate the chloroform eluates and recrystallize the desired 4-aza-5-(N- methyl - 4 - piperidylidene)-8-chloro-10,11-dihydro-5H-dibenzo-[a,d]-cycloheptene from hexane.

Preparation L

4-AZA-5-(N-METHYL-4-PIPERIDYLIDENE)10,11-DIHYDRO-5H-DIBENZO-[a,d]-CYCLOHEPTENE

Heat a mixture of 5 g. of 3-(β-phenethyl)-2-pyridyl N-methyl-4-piperidyl ketone and 250 g. of polyphosphoric acid at 160° C. for six hours with continuous stirring. Pour the resulting mixture into ice water, neutralize with ammonium hydroxide and extract with chloroform. Remove the excess solvent, absorb the residue onto 200 gms. of alumina and elute the column with benzene and finally with chloroform. Evaporate the chloroform eluates and recrystallize the desired 4-aza-5-(N - methyl - 4 - piperidylidene) - 10,11 - dihydro - 5H-dibenzo-[a,d]-cycloheptene from hexane, M.P. 119–121° C.

Preparation M

4-AZA-5-(N-METHYL-4-PIPERIDYL)10,11-DIHYDRO-5H-DIBENZO-[a,d]-CYCLOHEPTENE

Stir and heat a mixture of 3.5 gms. of 3-(β-phenethyl)-2-pyridyl N-methyl-4-piperidyl carbinol and 200 gms. of polyphosphoric acid at 160–170° C. for thirteen hours. Pour the mixture into ice water, neutralize with sodium hydroxide and extract the neutralized mixture with ether. Evaporate off the ether solvent, add isopropyl ether to the residue to obtain crystalline 4-aza-5-(N-methyl-4-piperidyl)-10,11-dihydro-5H-dibenzo-[a,d]-cycloheptene.

Preparation N

4-AZA-5-METHYL-5-(3-DIMETHYLAMINOPROPYL)-10,11-DIHYDRO-5H-DIBENZO-[a,d]-CYCLOHEPTENE

Stir and heat (160–170° C.) for thirteen hours a mixture of 3.8 gms. of 3-phenethyl-2-(1-hydroxy-1-methyl-3-dimethylaminopropyl)-pyridine and 200 gms. of polyphosphoric acid. Pour the mixture into water, neutralize with the sodium hydroxide and extract the neutralized mixture with ether. Evaporate off the ether solvent, add isopropyl ether to the residue to obtain crystalline 4-aza-5 - methyl - 5 - (3 - dimethylaminopropyl) - 10,11 - dihydro-5H-dibenzo-[a,d]-cycloheptene.

Thus from the appropriate intermediate nitriles, imines, ketones and carbinols embraced within the scope of Formula II (either per se or as equivalents thereof) and by following the teachings of the foregoing preparations there may be produced the following therapeutically useful compounds. (In the following listing, for the sake of brevity, the phrase "10,11-dihydro-5H-dibenzo-[a,d]-cycloheptene" is written as "dibenzocycloheptene"; accordingly in this abbreviated nomenclature the compound "4 - aza - 5 - (dimethylaminopropyl) - 10,11 - dihydro-5H-dibenzo-[a,d]-cycloheptene" is written as "4 - aza - 5 - (dimethylaminopropyl) - dibenzocycloheptene"):

4-aza-5-(N-methyl-4-piperidyl)-dibenzocycloheptene
4-aza-5-(4-piperidyl)-dibenzocycloheptene
4-aza-5-(N-benzyl-4-piperidyl)-dibenzocycloheptene
4-aza-5-(3-dimethylaminopropyl)-dibenzocycloheptene
4-aza-5-(3-pyrrolidinopropyl)-dibenzocycloheptene
4-aza-5-(4-dimethylaminocyclohexylmethyl)-dibenzocycloheptene
4-aza-5-(3-dimethylaminobutyl)-dibenzocycloheptene
4-aza-5-(3-diethylaminopropyl)-dibenzocycloheptene
4-aza-5-(3-(4-methylpiperazino)propyl)-dibenzocycloheptene
4-aza-5-(3-(4-(2-hydroxyethyl)-piperazino)-propyl)-dibenzocycloheptene
4-aza-5-(3-methylbenzylaminopropyl)-dibenzocycloheptene
4-aza-5-(2-methyl-3-dimethylaminopropyl)-dibenzocycloheptene
4-aza-5-(2-dimethylaminoethyl)-dibenzocycloheptene
4-aza-5-(2-methylaminoethyl)-dibenzocycloheptene
4-aza-5-(2-methyl-3-methylaminopropyl)-dibenzocycloheptene
4-aza-5-methyl-5-(N-methyl-4-piperidyl)-dibenzocycloheptene
4-aza-5-methyl-5-(4-piperidyl)-dibenzocycloheptene
4-aza-5-methyl-5-(N-benzyl-4-piperidyl)-dibenzocycloheptene
4-aza-5-methyl-5-(3-dimethylaminopropyl)-dibenzocycloheptene
4-aza-5-methyl-5-(3-pyrrolidinopropyl)-dibenzocycloheptene
4-aza-5-methyl-5-(4-dimethylaminocyclohexylmethyl)-dibenzocycloheptene
4-aza-5-methyl-5-(3-dimethylaminobutyl)-dibenzocycloheptene
4-aza-5-methyl-5-(3-diethylaminopropyl)-dibenzocycloheptene
4-aza-5-methyl-5-(3-(4-methylpiperazino)-propyl)-dibenzocycloheptene
4-aza-5-methyl-5-(3-(4-(2-hydroxyethyl)-piperazino)-propyl)-dibenzocycloheptene
4-aza-5-methyl-5-(3-methylbenzylaminopropyl)-dibenzocycloheptene
4-aza-5-methyl-5-(2-methyl-3-dimethylaminopropyl)-dibenzocycloheptene
4-aza-5-methyl-5-(2-dimethylaminoethyl)-dibenzocycloheptene
4-aza-5-methyl-5-(2-methylaminoethyl)-dibenzocycloheptene
4-aza-5-methyl-5-(2-methyl-3-methylaminopropyl)-dibenzocycloheptene
4-aza-5-(N-methyl-4-piperidylidene)-dibenzocycloheptene
4-aza-5-(4-piperidylidene)-dibenzocycloheptene
4-aza-5-(N-benzyl-4-piperidylidene)-benzocycloheptene
4-aza-5-(3-dimethylaminopropylidene)-benzocycloheptene
4-aza-5-(3-pyrrolidinopropylidene)-benzocycloheptene
4-aza-5-(4-dimethylaminocyclohexylmethylidene)-dibenzocycloheptene
4-aza-5-(3-dimethylaminobutylidene)-dibenzocycloheptene
4-aza-5-(3-diethylaminopropylidene)-dibenzocycloheptene
4-aza-5-(3-(4-methylpiperazino)-propylidene)-dibenzocycloheptene
4-aza-5-(3-(4-(2-hydroxyethyl)-piperazino)-propylidene)-dibenzocycloheptene
4-aza-5-(3-methylbenzylaminopropylidene)-dibenzocycloheptene
4-aza-5-(2-methyl-3-dimethylaminopropylidene)-dibenzocycloheptene
4-aza-5-(2-dimethylaminoethylidene)-dibenzocycloheptene
4-aza-5-(2-methylaminoethylidene)-dibenzocycloheptene
4-aza-5-(2-methyl-3-methylaminopropylidene)-dibenzocycloheptene and the 1-aza, 2-aza, and 3-aza analogs of the foregoing as well as their 7-bromo, 7-chloro, 7-methyl, 7-hydroxy, 7-methoxy, 7-trifluoromethyl, 8-bromo, 8-chloro, 8-methyl, 8-hydroxy, 8-methoxy, 8-trifluoromethyl, 7,8-dibromo, 7,8-dichloro, 7,8-dimethyl, 7,8-dihydroxy, 7,8-dimethoxy, derivatives. As stated heretofore to prepare the substituted aza-dibenzo-cycloheptenes having a substituent at one of the 6,7,8, and 9-positions, one merely employs the appropriately substituted reactant (for illustration see Preparation E). If these initial reactants are substituted, the substituent will appear in the benzenoid moiety of the aza-dibenzocycloheptene, the position dependent upon the position in the initial reactant. A para-substituent in the initial reactant gives ultimate rise to a 7-substituted aza-dibenzocycloheptene; an ortho substituent appears in the 9-position while a meta substituent gives rise to a mixture consisting of a 6-substituted and an 8-substituted aza-dibenzocycloheptene. To separate the mixture of 6- and 8-substituted aza-dibenzocycloheptenes, I prefer column chromatography whereby the mixture is absorbed on alumina and eluted with benzene-hexane fractions containing varying proportions of solvent. Combination of like eluates as determined by infra-red, ultraviolet, and thin-layer chromatography techniques provide for separation and isolation of the respective isomers. The substituted initial reactants are either known compounds or are readily prepared by methods well known to one of ordinary skill in the art.

I claim:

1. Phenethylpyridine having attached to the position vicinal to the phenethyl group the substituent

wherein Q is a member of the group consisting of (O), (NH), (H,OH), (lower alkyl, OH), and T is a member of the group consisting of lower alkyl, piperidyl and

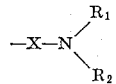

$R_1$ and $R_2$ are members of the group consisting of hydrogen and lower alkyl and together with the nitrogen atom to which they are attached form a heterocycle having 5–6 cyclic atoms, one of said cyclic atoms, other than the aforesaid nitrogen atom, being selected from the group consisting of C, O and N, all other cyclic atoms being carbon and X is a lower alkyl group having 2–9 carbon atoms.

2.

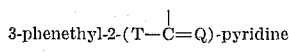

wherein Q is a member of the group consisting of (O), (NH), (H,OH) (lower alkyl, OH), and T is a member of the group consisting of lower alkyl, piperidyl and

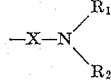

$R_1$ and $R_2$ are members of the group consisting of hydrogen and lower alkyl and together with the nitrogen atom to which they are attached form a heterocycle having 5–6 cyclic atoms, one of said cyclic atoms, other than the aforesaid nitrogen atom, being selected from the group consisting of C, O and N, all other cyclic atoms being carbon and X is a lower alkyl group having 2–9 carbon atoms.

3.

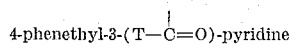

wherein Q is a member of the group consisting of (O), (NH), (H,OH), (lower alkyl, OH), and T is a member of the group consisting of lower alkyl, piperidyl, and

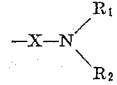

$R_1$ and $R_2$ are members of the group consisting of hydrogen and lower alkyl and together with the nitrogen atom to which they are attached form a heterocycle having 5–6 cyclic atoms, one of said cyclic atoms, other than the aforesaid nitrogen atom, being selected from the group consisting of C, O and N, all other cyclic atoms being carbon and X is a lower alkyl group having 2–9 carbon atoms.

4.

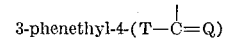

wherein Q is a member of the group consisting of (O), (NH), (H,OH), (lower alkyl, OH), and T is a member of the group consisting of lower alkyl, piperidyl, and

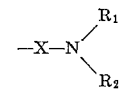

$R_1$ and $R_2$ are members of the group consisting of hydrogen and lower alkyl and together with the nitrogen atom to which they are attached form a heterocycle having 5–6 cyclic atoms, one of said cyclic atoms, other than the aforesaid nitrogen atom, being selected from the group consisting of C, O and N, all other cyclic atoms being carbon and X is a lower alkyl group having 2–9 carbon atoms.

5.

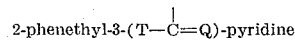

wherein Q is a member of the group consisting of (O), (NH), (H,OH), (lower alkyl, OH), and T is a member of the group consisting of lower alkyl, piperidyl, and

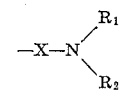

$R_1$ and $R_2$ are members of the group consisting of hydrogen and lower alkyl and together with the nitrogen atom to which they are attached form a heterocycle having 5–6 cyclic atoms, one of said cyclic atoms, other than the aforesaid nitrogen atom, being selected from the group consisting of C, O and N, all other cyclic atoms being carbon and X is a lower alkyl group having 2–9 carbon atoms.

6. Phenethylpyridine having attached to the position vicinal to the phenethyl group the substituent

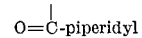

7. Phenethylpyridine having attached to the position vicinal to the phenethyl group the substituent

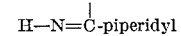

8.

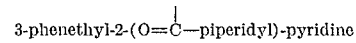

9.

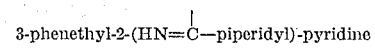

10.

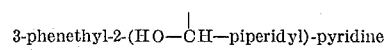

11. 2 - {3-[β-(3-chlorophenyl)-ethyl]-pyridyl}-N-methyl-4-piperidyl ketone.

12. 2 - {3-[β-(3-chlorophenyl)-ethyl]-pyridyl}-N-methyl-4-piperidyl imine.

13. 2 - {3-[β-(3-chlorophenyl)-ethyl]-pyridyl}-N-methyl-4-piperidyl carbinol.

No references cited.

WALTER A. MODANCE, *Primary Examiner.*

AVROM D. SPEVACK, *Assistant Examiner.*